(12) United States Patent
Wakamori et al.

(10) Patent No.: US 7,127,792 B2
(45) Date of Patent: Oct. 31, 2006

(54) METHOD OF MANUFACTURING SPRING ASSEMBLY

(75) Inventors: Masami Wakamori, Kanagawa (JP); Toshie Fueki, Kanagawa (JP)

(73) Assignee: Piolax, Inc., Yokohama (JP)

( * ) Notice: Subject to any disclaimer, the term of this patent is extended or adjusted under 35 U.S.C. 154(b) by 189 days.

(21) Appl. No.: 10/880,609

(22) Filed: Jul. 1, 2004

(65) Prior Publication Data

US 2005/0005450 A1    Jan. 13, 2005

(30) Foreign Application Priority Data

Jul. 2, 2003    (JP)    .................... P.2003-189983

(51) Int. Cl.
*B23P 11/00*    (2006.01)
*F16F 1/12*    (2006.01)

(52) U.S. Cl. .................... 29/509; 29/469.5; 29/507; 29/513; 29/521; 29/896.91; 267/179

(58) Field of Classification Search ............. 29/509, 29/469.5, 505, 507, 512, 521, 896.91, 896.9, 29/513; 267/179

See application file for complete search history.

(56) References Cited

U.S. PATENT DOCUMENTS

| 3,782,708 | A | * | 1/1974 | Dulude et al. | .................. 267/91 |
| 3,859,705 | A | * | 1/1975 | Dulude et al. | ............. 29/564.1 |
| 3,862,751 | A | * | 1/1975 | Schwaller | ..................... 267/91 |
| 3,866,287 | A | * | 2/1975 | Dulude et al. | ........... 29/896.91 |
| 3,891,823 | A | * | 6/1975 | Dulude et al. | ........... 219/85.15 |
| 4,212,099 | A | * | 7/1980 | Williams et al. | ............... 29/507 |
| 4,233,726 | A | * | 11/1980 | Williams | ..................... 29/507 |
| 4,371,154 | A | * | 2/1983 | Winbigler | .................. 267/179 |
| 4,756,071 | A | * | 7/1988 | Takeuchi | .................... 29/515 |
| 4,916,801 | A | * | 4/1990 | Cooper | ........................ 29/512 |
| 4,924,584 | A | * | 5/1990 | Harney | ........................ 29/509 |
| 5,772,191 | A | * | 6/1998 | Nakano et al. | ............. 267/289 |
| 6,575,439 | B1 | * | 6/2003 | Costello et al. | ................ 267/89 |
| 2004/0107560 | A1 | * | 6/2004 | Wakamori et al. | ............ 29/512 |
| 2005/0017422 | A1 | * | 1/2005 | Wakamori et al. | .......... 267/179 |

FOREIGN PATENT DOCUMENTS

| EP | 264276 A2 | * | 4/1988 |
| EP | 539955 A1 | * | 5/1993 |

(Continued)

OTHER PUBLICATIONS

On-line English translation of JP 2003-025165 A.*

*Primary Examiner*—Essama Omgba
(74) *Attorney, Agent, or Firm*—McGinn IP Law Group, PLLC

(57) ABSTRACT

A method of manufacturing a spring assembly, which includes two annular plates and compression coil springs, and which is adapted so that the compression coil springs are assembled to the annular plates by caulking projection portions formed on the two annular plates, respectively. Projection portions are formed at the side of the annular plates. Plural large-diameter walls and plural small-diameter walls are alternately provided in the circumferential direction of each of the projection portions. A punch having a portion, whose diameter is larger than the inside diameter of a space between the small-diameter walls, is inserted into an inner space among the large-diameter walls and the small-diameter walls of each of the projection portions. As the small-diameter walls of each of the projection portions are enlarged in diameter, the large-diameter walls adjoining each of these small-diameter walls are easily enlarged in diameter.

4 Claims, 10 Drawing Sheets

FOREIGN PATENT DOCUMENTS

| | | | |
|---|---|---|---|
| EP | 1416186 | * | 5/2004 |
| JP | 01176824 A | * | 7/1989 |
| JP | 05126189 A | * | 5/1993 |
| JP | 10311357 A | * | 11/1998 |
| JP | 3288458 | | 3/2002 |

* cited by examiner

METHOD OF MANUFACTURING SPRING ASSEMBLY

BACKGROUND OF THE INVENTION

1. Field of the Invention

The present invention relates to a method of manufacturing a spring assembly to be used as, for example, a return spring means for returning a multiple disc clutch piston in a clutch mechanism of an automotive automatic transmission.

2. Description of the Related Art

This kind of related spring assembly (although not concretely shown) includes two annular plates and plural compression coil springs interposed between these annular plates in the circumferential direction thereof at predetermined intervals. At the practical assembling thereof, a state, in which each of the end turn portions of the compression coil springs is set on the outer periphery of a projection portion formed in such a way as to face an associated one of the inner surfaces of the annular plates, is obtained. Then, each of the projection portions is outwardly enlarged in diameter by using a caulking punch. Thus, each of the end turn portions of the compression coil springs is supported by being sandwiched between the outer peripheral surface of an associated one of the projection portions and the inner surface of an associated one of the annular plates.

With such a configuration, in the step of assembling a same-side one of the end turn portions of each of the compression coil springs to an associated one of the annular plates, the caulking punch can easily be made to come closer to an associated one of the projection portions. Thus, the projections can relatively easily be caulked. However, in the step of assembling the other end turn portion of each of the compression coil springs to the associated one of the annular plates, the caulking punch cannot easily be inserted into a region between the annular plates. In this case, extremely difficult and troublesome operations are forcibly performed.

Thus, hitherto, the following method has been proposed as a countermeasure thereagainst. That is, in the case of assembling a same-side one of the end turn portions of each of the compression coil springs to an associated one of the annular plates, the associated one of the projection portions is caulked by using an ordinary caulking punch as heretofore. However, in the case of assembling the other end turn portion of each of the compression coil springs to the associated one of the annular plates, caulking is performed by using a longitudinal split punch and a spreading pin.

Concretely, the longitudinally split punch has an outside diameter that is slightly smaller than the inside diameter of the projection portion. An end portion of the longitudinally split punch is split by a splitting groove in such a manner as to be able to be enlarged. The spreading pin has such an outside diameter that this pin can be inserted into the projection portion associated with the other annular plate. The end portion of the longitudinally split punch can be spread by leading the pointed end portion of the spreading pin into the splitting groove of the longitudinally split punch.

Thus, the end portion of the longitudinally split punch is inserted from the inside of the projection portion associated with one of the annular plate, which has already been caulked, and then made to descend, while the pointed end portion of the spreading pin is faced to the inside of the projection portion provided at the side of the other annular plate to be caulked. Then, the pointed end portion of the spreading pin is led into the splitting groove, so that the end portion of the longitudinally split punch is spread. Consequently, the projection portions can be outwardly spread and caulked (see, for instance, Japanese Patent No. 3288458).

Therefore, according to the related manufacturing method, the projection portion associated with the other annular plate can easily be caulked by using the longitudinally split punch and the spreading pin. Thus, an operation of assembling the other annular plate and the compression coil spring to each other is improved. However, in the case of caulking the projection portion, the projection portion is not uniformly spread over the entire circumference thereof but only partly spread at the end portion thereof, which is split through the splitting groove of the longitudinally split punch. Thus, the holding forces of the compression coil springs against the other annular plate decrease by themselves. Consequently, there is a fear that the compression coil springs may disengage therefrom. Also, the end portion of the longitudinally split punch itself is split through the splitting groove. Thus, the end portion of the longitudinally split punch is poor in strength. Consequently, there is a fear that the longitudinally split punch may easily be broken and abrade away.

SUMMARY OF THE INVENTION

The invention is developed to effectively solve the problems that such a related manufacturing method has. According to an aspect of the invention, there is provided a method (hereunder referred to as a first method of the invention) of manufacturing a spring assembly, which includes an annular plate and a compression coil spring, and which is adapted to assemble the compression coil spring to the annular plate by caulking a projection portion formed in the annular plate. This method including the step of forming the projection portion in the annular plate as the projection portion to be opposite to the compression coil spring, the step of alternately providing plural large-diameter walls and plural small-diameter walls in a circumferential direction of the projection portion, and the step of inserting a punch having a portion, whose diameter is larger than an inside diameter of a space between the small-diameter walls, into inside of a space surrounded by the large-diameter walls and the small-diameter walls of the projection portions and enlarging the projection portions in diameter to thereby enlarge the large-diameter walls adjoining each of the small-diameter walls similar to the small-diameter walls of the projection portions in diameter.

According to another aspect of the invention, there is provided a method (hereunder referred to as a second method of the invention) of manufacturing a spring assembly, which includes annular plates and compression coil springs, and which is adapted to assemble the compression coil springs to each of the annular plates by caulking projection portions formed in the annular plates. This method including the step of forming the projection portions in each of the annular plates as the projection portions to be opposite each other, the step of setting one of end turn portions of each of the compression springs on projection portions of one of the annular plates under a condition that plural large-diameter walls and plural small-diameter walls are alternately provided in a circumferential direction of each of the projection portion, the step of inserting a punch having a portion, whose diameter is larger than an inside diameter of a space between the small-diameter walls, into inside of a space surrounded by the large-diameter walls and the small-diameter walls of the projection portions and enlarging the projection portions in diameter to thereby enlarge the large-diameter walls adjoining each of the small-diameter walls similar to the small-diameter walls of the projection portions in diameter, the step of setting the other end turn portion of each of the compression coil springs on an associated one of the projection portions of the other annular plate, and the step of inserting a punch having a portion, whose diameter is larger than an inside diameter of a space between the small-diameter walls into inside of a space surrounded by the large-diameter walls and the small-diameter walls of each of the projection portions provided in the one of the annular plates, and enlarging each of the projection portions in diameter to thereby enlarge the large-diameter walls adjoining each of the small-diameter walls similar to the small-diameter walls of the projection portions in diameter.

According to still another aspect of the invention, there is provided a method (hereunder referred to as a third method of the invention) of manufacturing a spring assembly, which includes two annular plates and compression coil springs, and which is adapted to assemble the compression coil springs to the annular plates by caulking projection portions formed in the two annular plates. This method including the step of forming the projection portions in each of the annular plates as the projection portions to be opposite each other, the step of inserting a punch having a portion, whose diameter is larger than an inside diameter of a space between the small-diameter walls into inside of a space surrounded by the large-diameter walls and the small-diameter walls of each of the projection portions provided in the one of the annular plates under a condition that the plural large-diameter walls and the plural small-diameter walls are alternately provided in a circumferential direction of each of the projection portions formed in each of the annular plates, to thereby enlarge the large-diameter walls of the projection portions of each of the annular plates in diameter.

According to an embodiment (hereunder referred to as a fourth method of the invention) of one of the first to third methods of the invention, at least a part of each of the small-diameter walls of the projection portions is inwardly tilted.

Therefore, according to the first method of the invention, the projection portions are formed in each of the annular plates. Then, the plural large-diameter walls and the plural small-diameter walls are alternately provided in the circumferential direction of each of the projection portions. Thus, as the space between the small-diameter walls is enlarged in diameter, the space between the large-diameter walls can be enlarged in diameter only by inserting an ordinary caulking punch having a projection portion, whose diameter is larger than the inside diameter, into the inside of the space surrounded by the large-diameter walls and the small-diameter walls of each of the projection portions. Consequently, the need for using a related punch, which has problems with strength and durability, is eliminated.

According to the second method of the invention, the projection portions are formed in each of the two annular plates. Then, the plural large-diameter walls and the plural small-diameter walls are alternately provided in the circumferential direction of each of the projection portions. Thus, similarly to the case of the first method of the invention, as the space between the small-diameter walls is enlarged in diameter, the space between the large-diameter walls can be enlarged in diameter only by inserting an ordinary caulking punch having a projection portion, whose diameter is larger than the inside diameter, into the inside of the space surrounded by the large-diameter walls and the small-diameter walls of each of the projection portions. Consequently, the need for using a related punch, which has problems with strength and durability, is eliminated. Moreover, the two annular plates can be shared, so that the spring assembly including the used punch becomes extremely economical.

According to the third method of the invention, the ordinary caulking punch is inserted from a side opposite to the surface, in which each of the projection portions of one of the two annular plates is formed, into the inside of this projection portion. Thus, as the small-diameter walls of each of the projection portions provided in the one of the annular plates are enlarged in diameter, the large-diameter walls thereof are enlarged in diameter. Simultaneously, as the small-diameter walls of each of the projection portions provided in the other annular plates are enlarged in diameter, the large-diameter walls thereof are enlarged in diameter. Thus, the caulking of the upper and lower projection portions can be achieved in a single step. Moreover, similarly, the need for using a related punch, which has problems with strength and durability, is eliminated.

According to the fourth method of the invention, when an ordinary caulking punch is inserted from the side opposite to the surface, in which each of the projection portions of one of the annular plates is formed, into the inside of this projection portion, a part of each of the small-diameter walls is inwardly tilted. Thus, the small-diameter walls can reliably be enlarged in diameter. Consequently, the punch can be inserted more deeply.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, the invention is described in detail on the basis of preferred embodiments thereof illustrated in the accompanying drawings. Basically, according to a first embodiment, a method of manufacturing a spring assembly, which includes two annular plates, and plural compression coil springs, which are arranged in the circumferential direction of each of these annular plates and interposed therebetween, similarly to the spring assembly manufactured by the related method. It is assumed that each of both end turn portions of the compression coil springs is surrounded between the outer peripheral surface of the projection portion and the inner surface of the annular plate by outwardly enlarging each of the projection portions formed in each of the two annular plates. However, this embodiment of the invention features the following respects.

Figure 1A:
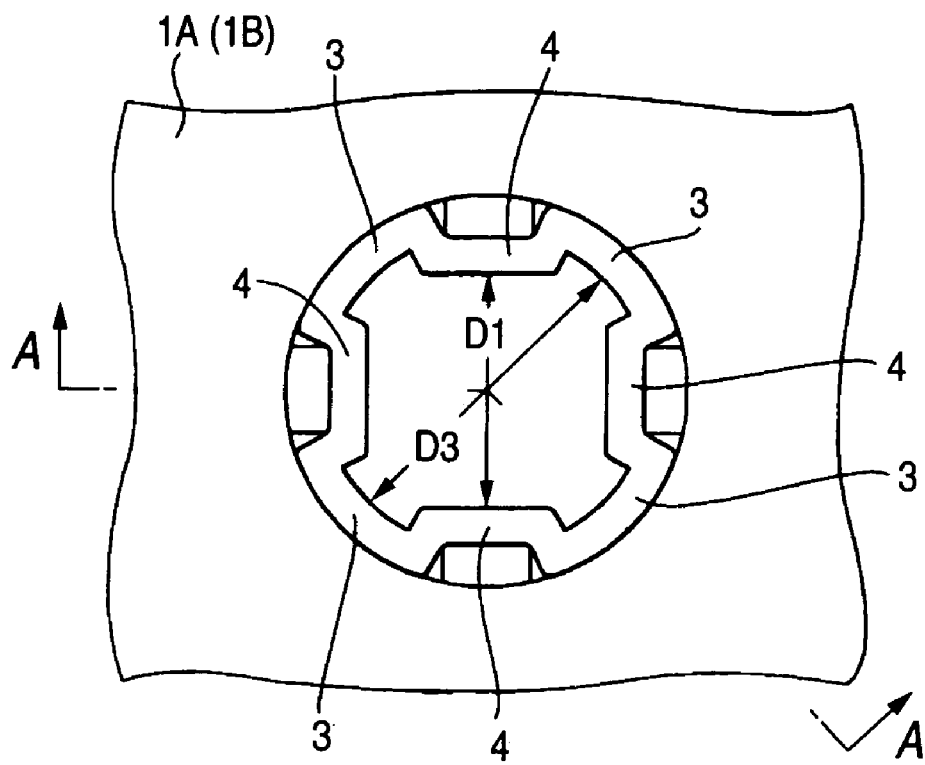
FIG. 1A is a primary-part plan view illustrating the configuration of a projection portion associated with an annular plate to be used in a manufacturing method according to a first embodiment of the invention.
Figure 1B:
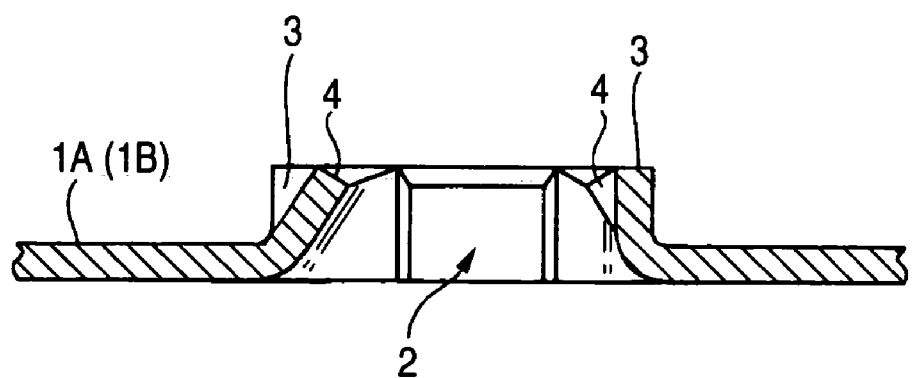
FIG. 1B is a cross-sectional view taken on line A—A of FIG. 1A.

That is, first, regarding the two annular plates 1A and 1B, as shown in FIGS. 1A and 1B, cylindrical projection portions 2, which are formed in the inner surface of each of the two annular plates and opposed to those of the other annular plate, are extended in such a way as to become higher than the wire of the end turn portion of an associated one of the compression coil springs. Four large-diameter walls 3 and four small-diameter walls 4 are alternately provided in the circumferential direction of each of the projection portions 2 by drawing. Moreover, the entirety of each of the small-diameter walls 4 is inwardly tilted. Then, this small-diameter wall 4 is outwardly and directly enlarged in diameter by the punch. As each of the small-diameter walls 4 is enlarged in diameter, the large-diameter walls 3 adjoining each of the small-diameter walls 4 are indirectly enlarged in diameter. Incidentally, in this case, the annular plates 1A, 1B formed into the same shape can be used upwardly/downwardly, so that this embodiment is extremely economical.

Figure 2:
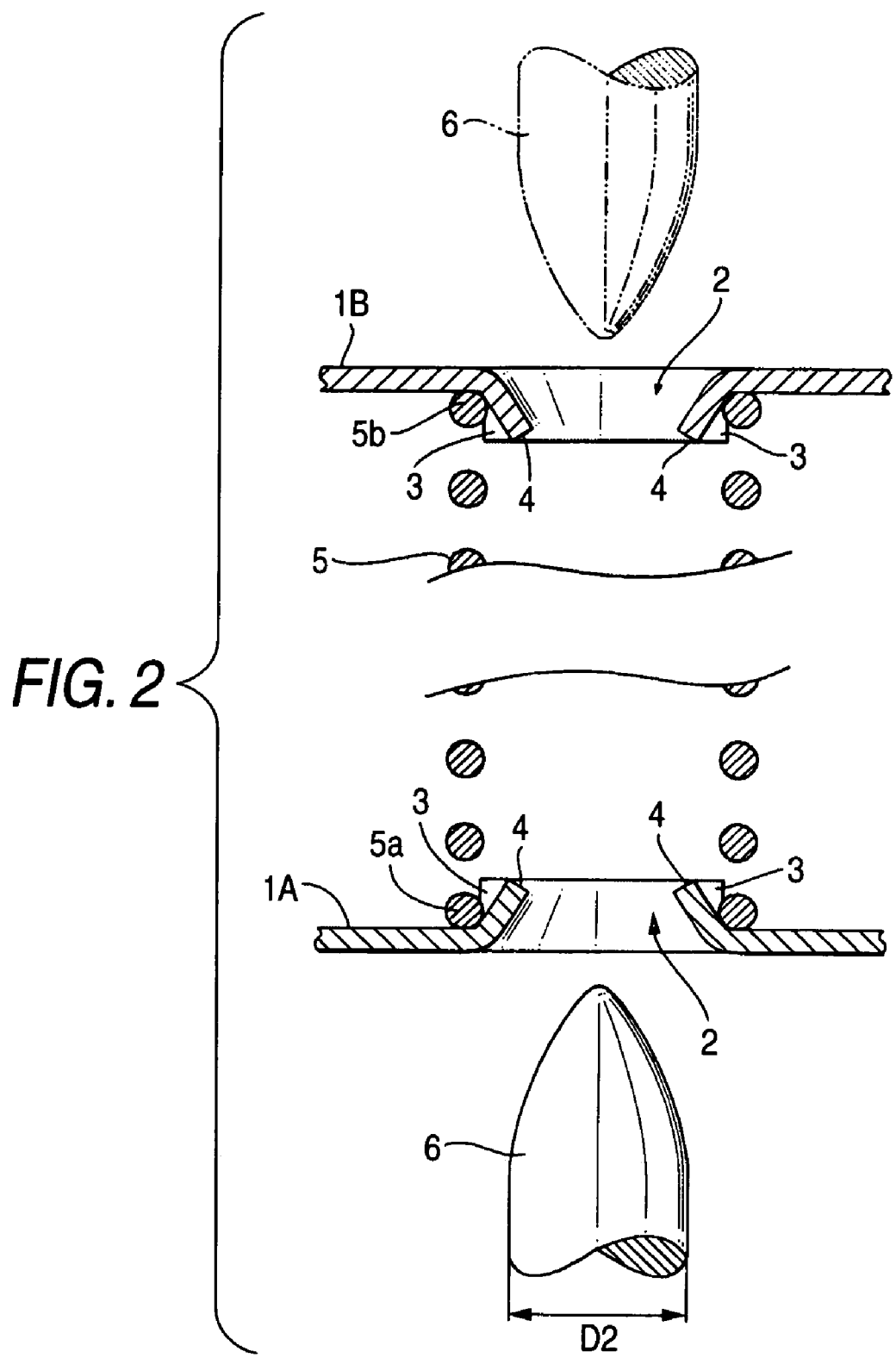
FIG. 2 is an explanatory view illustrating a state in which two annular plates are opposed to each other in the first embodiment, and in which the end turn portions of the compression coil springs are set on the outer peripheral portions of the projection portions respectively associated with the annular plates.
Figure 3:
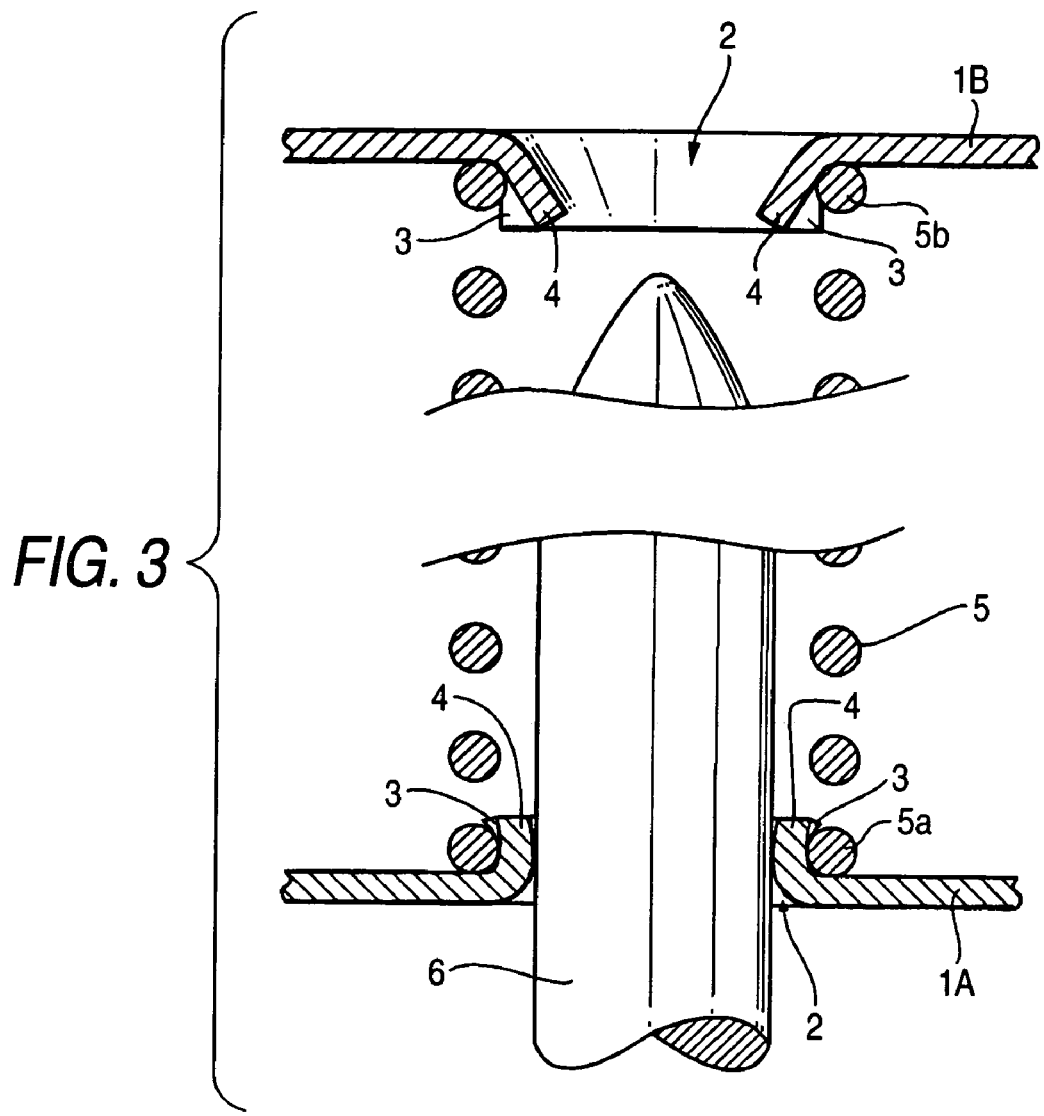
FIG. 3 is an explanatory view illustrating a state in which one of two pairs of the small-diameter wall and the large-diameter wall is enlarged in diameter by inserting a punch in the first embodiment.

Thus, according to the first embodiment, in the case that the plural compression coil springs 5 are interposed between the two annular plates 1A and 1B, first, as shown in FIG. 2, the two annular plates 1A and 1B are opposed to each other. Thus, a state, in which the associated end turn portions 5a and 5b of the compression coil springs 5 are set on the outer peripheries of the projection portions 2 opposed to each other in an upward or downward direction, respectively, is obtained. Then, the punch 6 having a portion, whose diameter D2 is larger than the inside diameter D1 of a space between the small-diameter walls 4, is inserted from the side opposite to a surface, from which one of the upper and lower projection portions 2 is formed, to the inside of a space surrounded by the large-diameter walls 3 and the small-diameter walls 4. First, the small-diameter wall 4 at the side, at which the punch is inserted, is forcibly and outwardly spread. Simultaneously with this, the large-diameter walls 3 adjoining each of the small-diameter walls 4 are indirectly enlarged in diameter. One of end turn portions of each of the compression coil springs 5 is supported by being partly surrounded between the outer peripheral surface of one of the large-diameter walls 3 and the inner surface of the annular plate 1A. Incidentally, at that time, the following relation holds: D1<D2<D3 where D3 designates the inside diameter of a space between the large-diameter walls 3.

Figure 4:
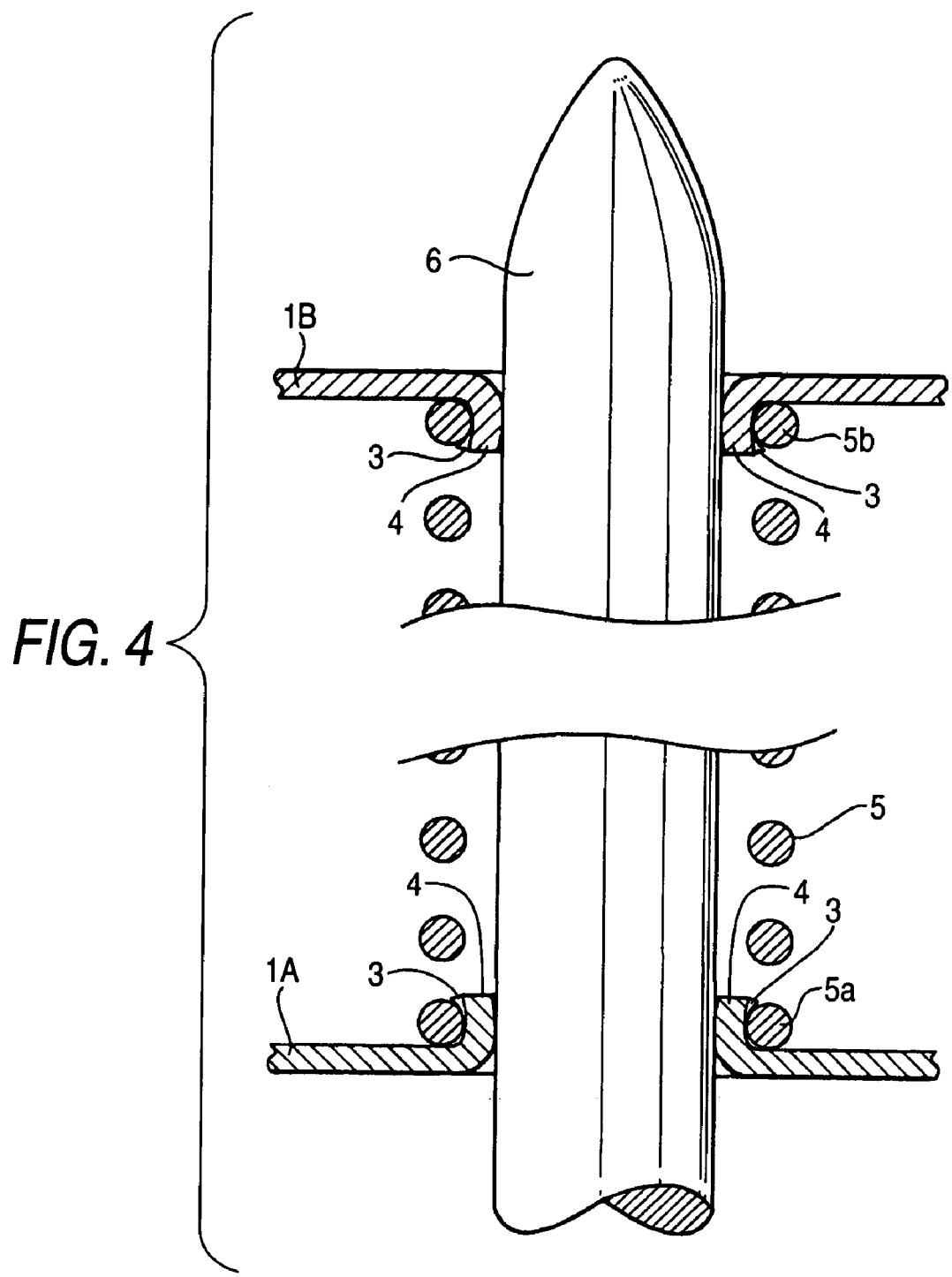
FIG. 4 is an explanatory view illustrating a state in which the other pair of the small-diameter wall and the large-diameter wall is enlarged in diameter by more deeply inserting a punch therebetween in the first embodiment.

Subsequently, in this state, a tilted one of the small-diameter walls 4 has already and outwardly been spread due to the difference in diameter between this wall and the punch 6, so that the punch 6 is permitted to more deeply be inserted. Thus, when the same punch 6 is inserted to the inside of a space surrounded by the large-diameter walls 3 and the small-diameter walls 4 of the other annular plate 1B by utilizing this state, the small-diameter walls 4 are also outwardly and forcibly spread, as shown in FIG. 4. Simultaneously with this, the large-diameter walls 3 adjoining each of the small-diameter walls 4 are indirectly enlarged in diameter. The other end turn portion 5b of each of the compression coil springs 5 is supported by being partly surrounded between the outer peripheral surface of the other large-diameter wall 3 and the inner surface of the annular plate 1B. Consequently, the assembling of each of the compression coil springs 5 to both the one of the annular plates and the other annular plate can be achieved at a time by sharing the same punches 6.

Figure 9A:
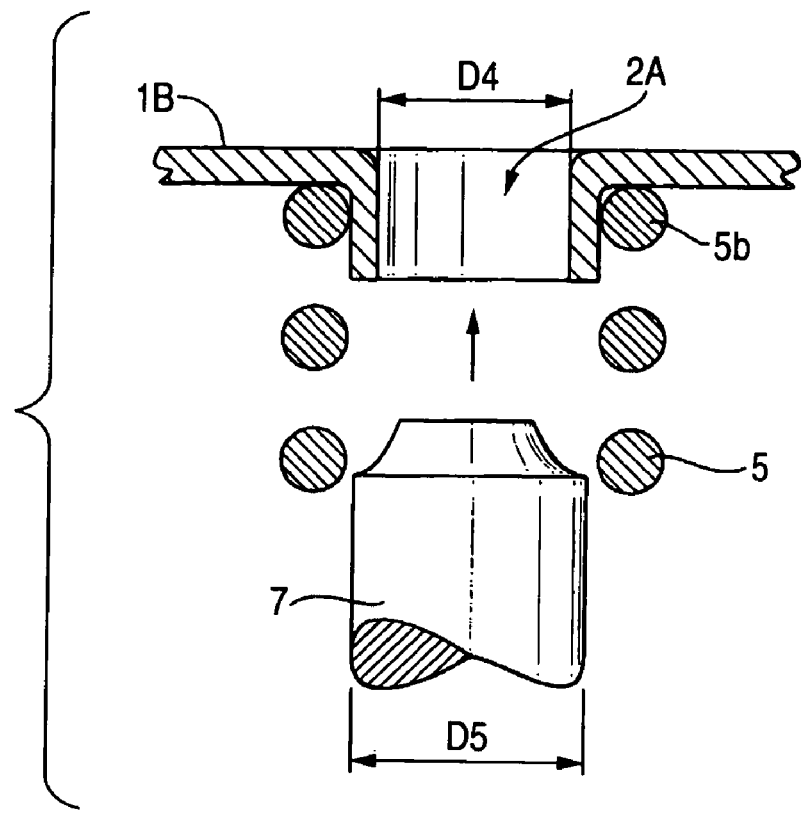
FIG. 9A is an explanatory view illustrating a state in which the projection portion associated with the other annular plate is enlarged in diameter in the third embodiment.
Figure 9B:
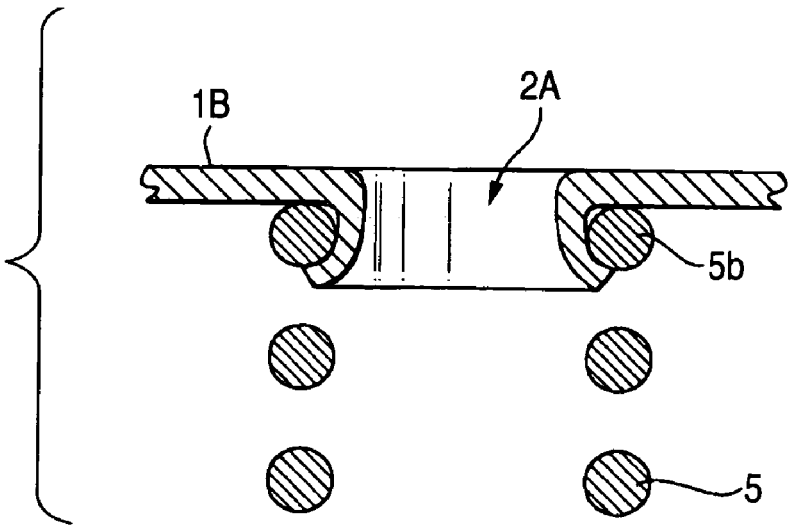
FIG. 9B is an explanatory view illustrating this state in which the projection portion is enlarged in diameter.
Figure 10A:
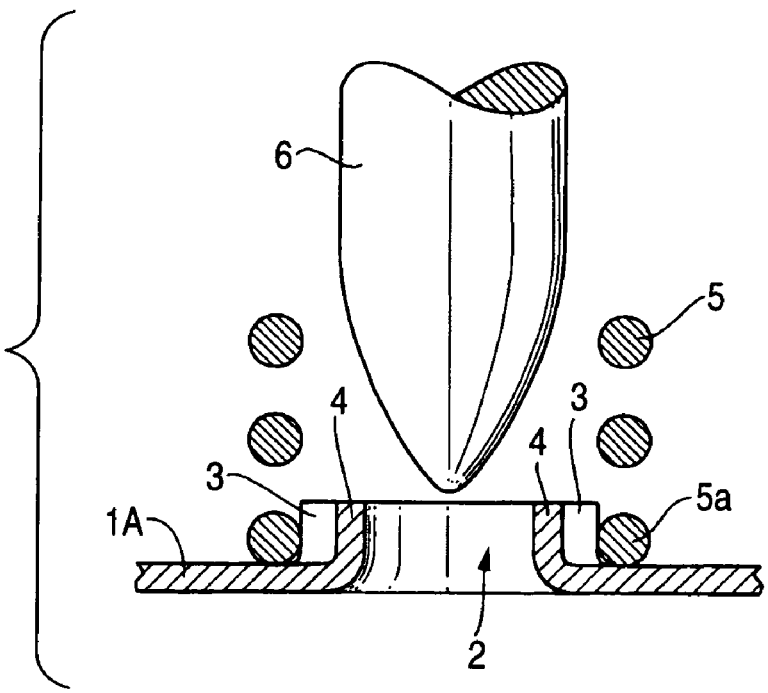
FIG. 10A is an explanatory view illustrating a state in which a pair of a small-diameter wall and a large-diameter wall associated with one of the annular plates is enlarged in diameter in the third embodiment.
Figure 10B:
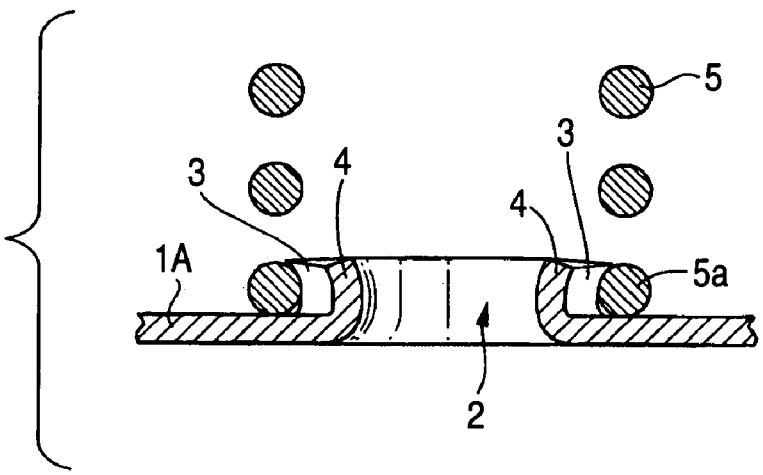
FIG. 10B is an explanatory view illustrating this state in which the pair of the small-diameter wall and the large-diameter wall is enlarged.

Incidentally, in the first embodiment, the two annular plates 1A and 1B each having the same shape are used so as to share the annular plates 1A, 1B and the punches 6. However, the invention is not limited thereto. A spring assembly may be configured so that only simply cylindrical projection portions similar to the projection portions are formed in the other annular plate 1B, as shown in FIGS. 9A and 9B, and that another punch having a portion, whose diameter is larger than the inside diameter of each of the projection portions, is inserted into the inside of these cylindrical projection portions to thereby enlarge the cylindrical projection portions. In this case, simply cylindrical projection portions of the other annular plate 1B are caulked. Subsequently, the punch 6 having a portion, whose diameter D2 is inserted from the inside of the caulked projection portion to the inside of a space between the large-diameter walls 3 and the small-diameter walls 4. Then, as described above, the large-diameter walls 3 in the projection portions 2 of one 1A of the annular plates are indirectly enlarged in diameter.

Figure 5A:
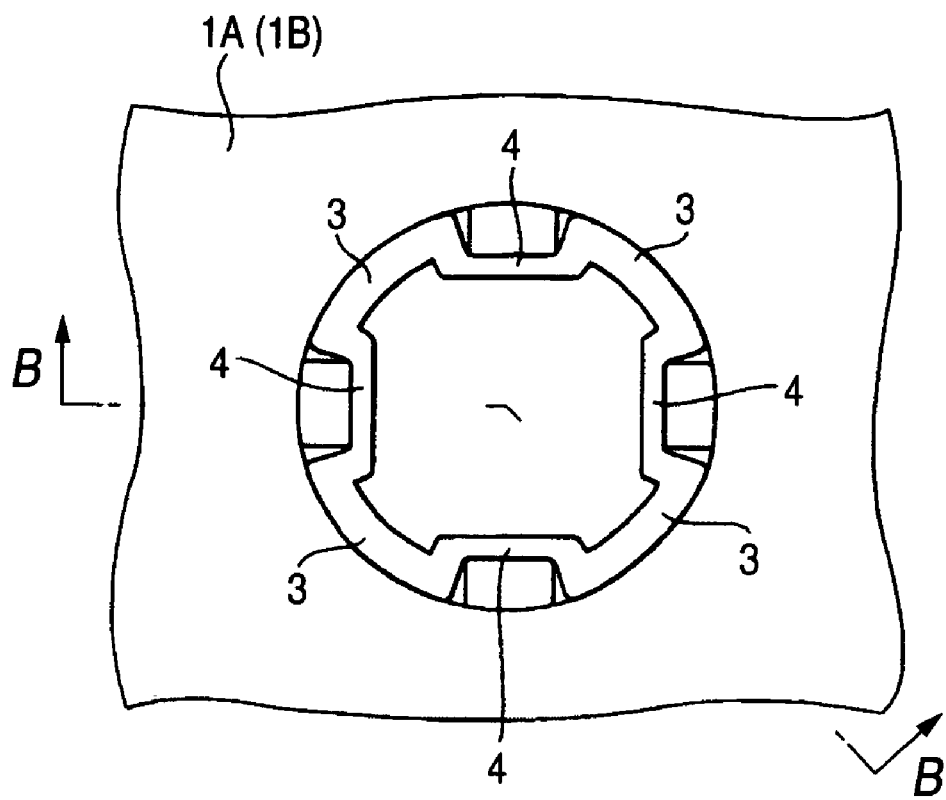
FIG. 5A is a primary-part plan view illustrating the configuration of a projection portion associated with each of annular plates to be used in a manufacturing method according to a second embodiment of the invention.
Figure 5B:
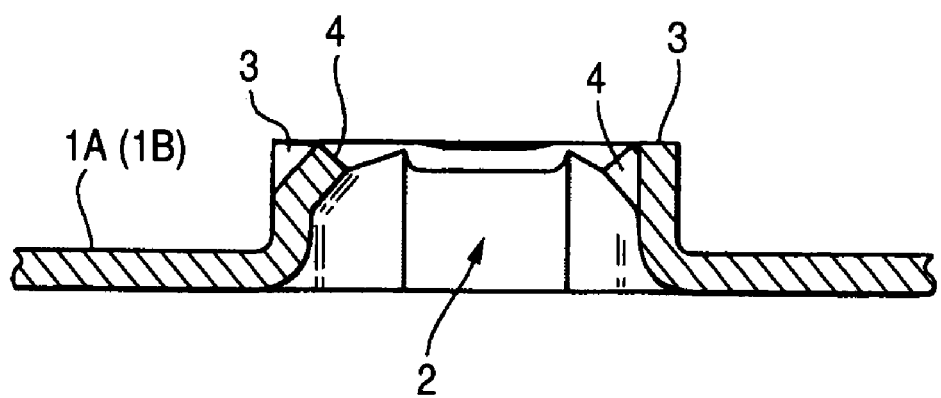
FIG. 5B is a cross-sectional view taken on line B—B of FIG. 5A.

Next, a method of manufacturing a spring assembly according to a second embodiment of the invention is described hereinbelow. The method according to the second embodiment basically follows the method according to the first embodiment without being modified. The method according to the second embodiment differs from that according to the first embodiment in that as shown in FIGS. 5A and 5B, each of the small-diameter walls 4, which are provided in such a way as to alternately arrange the large-diameter wall 3 and the small-diameter wall 4 in the circumferential direction of each of the projection proportions 2, is adapted so that the bottom side part thereof is substantially perpendicularly erected and that only the top portion thereof is inwardly tilted, instead of inwardly and linearly tilting the entirety of each of the small-diameter walls 4, similarly to the first embodiment.

Figure 6:
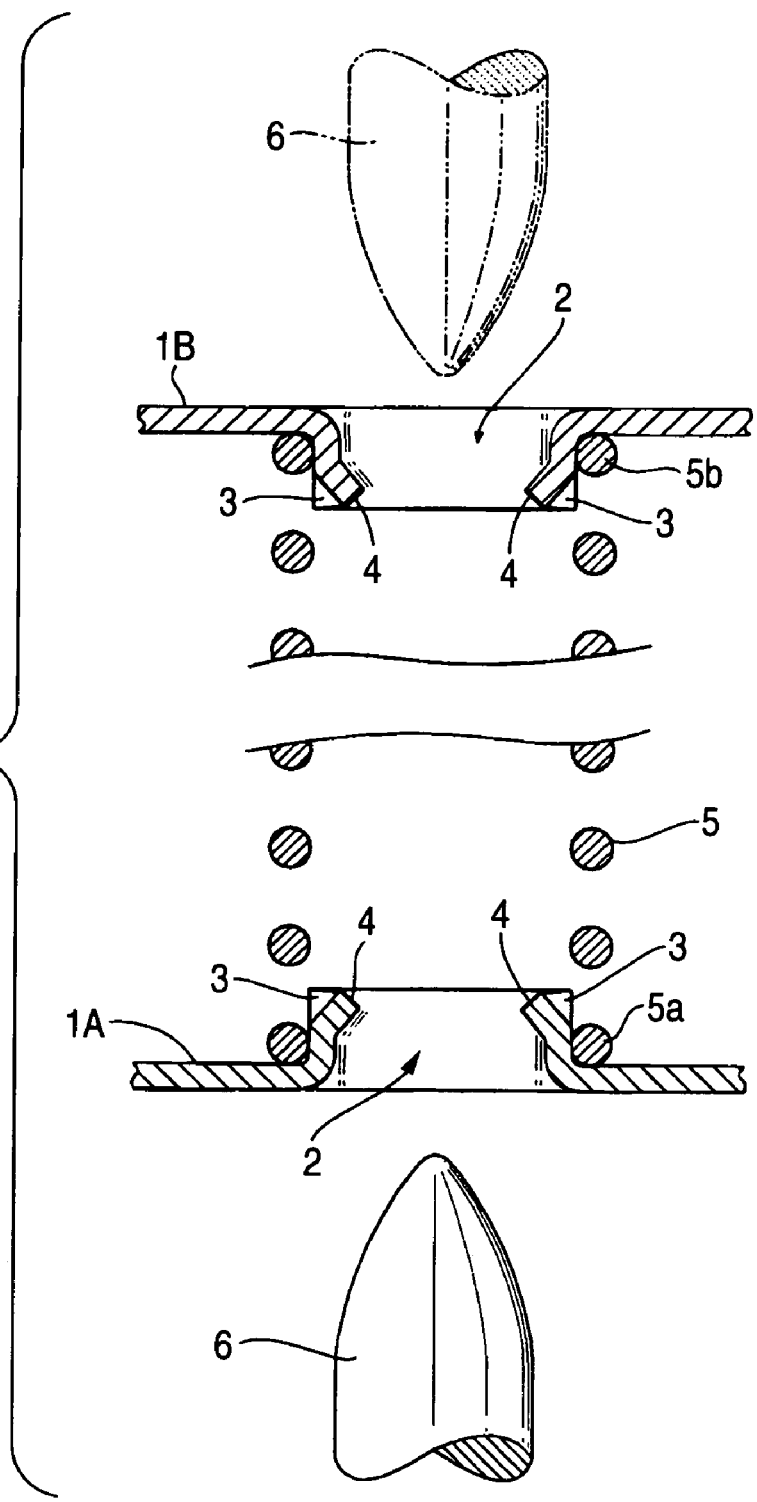
FIG. 6 is an explanatory view illustrating a state, in which two annular plates are opposed to each other in the second embodiment, and in which the end turn portions of the compression coil springs are set on the outer peripheral portions of the projection portions respectively associated with the annular plates.

Therefore, according to the second embodiment, even in the case where plural compression coil springs 5 are interposed between the two annular plates 1A and 1B, a state, in which the two annular plates 1A and 1B are opposed to each other and the associated end turn portions 5a and 5b of each of the compression coil springs 5 are set on the outer periphery of the projection portions 2 opposed to each other upwardly or downwardly, as shown in FIG. 6, is obtained, similarly to the first embodiment. Then, a punch 6 having a portion, whose diameter D2 is larger than the inside diameter D1 of a space between the small-diameter walls 4, is inserted from the side opposite to a surface, from which one of the upper and lower projection portions 2 is formed, to the inside of a space surrounded by the large-diameter walls 3 and the small-diameter walls 4. First, the small-diameter wall 4 at the side, at which the punch is inserted, is forcibly and outwardly spread. Simultaneously with this, the lower part perpendicularly erected is enlarged in diameter over the entire circumference thereof. In addition, the large-diameter walls 3 adjoining each of the small-diameter walls 4 are indirectly enlarged in diameter. Thus, one 5a of the end turn portions of the compression coil springs 5 is supported by being surrounded between the lower part of each of the perpendicularly erected large-diameter walls 3 and the inner surface of the annular plate 1A along the entire circumference thereof. Additionally, the end turn portion 5a is supported by being partly surrounded between the outer periphery of the associated large-diameter wall 3 and the inner surface of this annular plate. Thus, a strong supporting force can be obtained. Incidentally, at that time, the following relation holds: D1 <D2<D3 where D3 designates the inside diameter of a space between the large-diameter walls 3.

Figure 7:
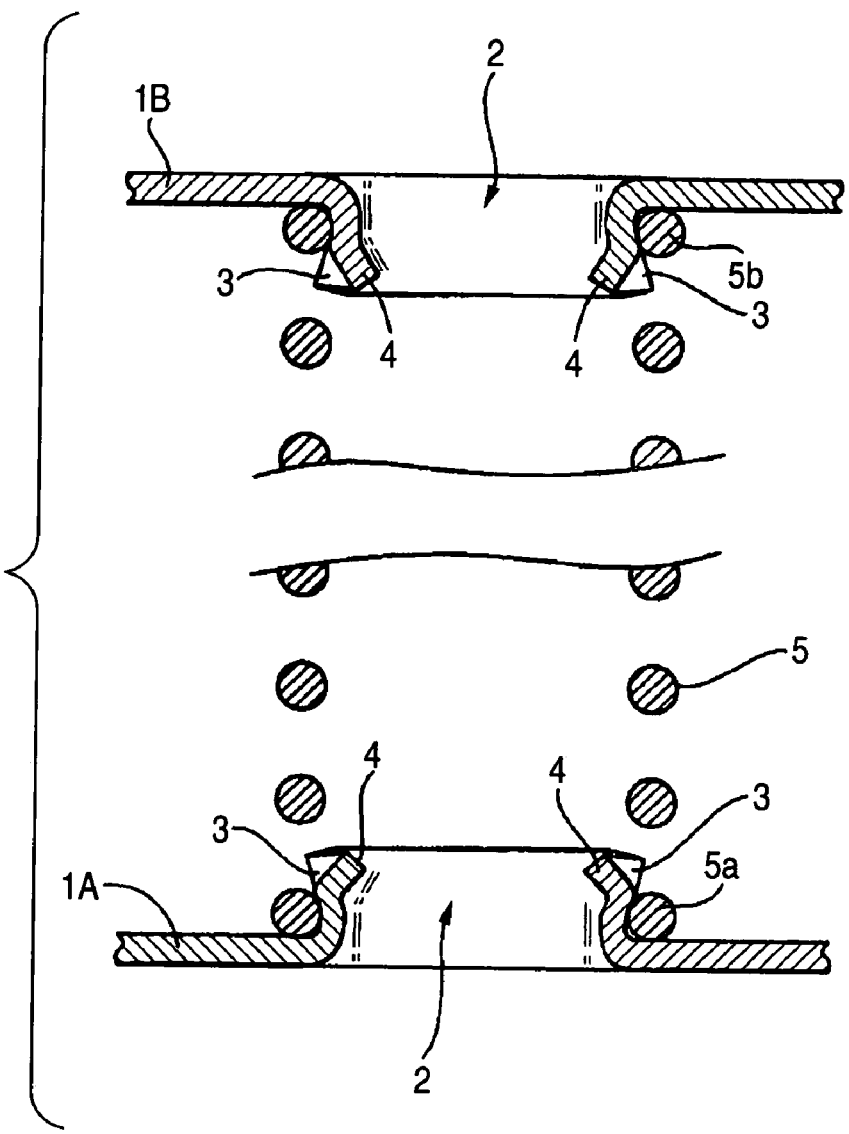
FIG. 7 is an explanatory view illustrating a state in which one of two pairs of a small-diameter wall and a large-diameter wall is enlarged in diameter, and in which the other pair of the small-diameter wall and the large-diameter wall is enlarged in diameter.

Subsequently, because the partly tilted small-diameter walls 4 are already spread outwardly and forcibly even in this state and permit the punch 6 to more deeply be inserted, the same punch 6 is inserted to the inside of the space surrounded by the large-diameter walls 3 and the small-diameter walls 4 of the other projection portion 2 by utilizing this state. Also, the small-diameter walls 4 of the other projection portion 2 are outwardly and forcibly spread. Simultaneously with this, the perpendicularly erected bottom parts thereof are enlarged in diameter over the entire circumference thereof. In addition, the large-diameter walls 3 adjoining each of the small-diameter are indirectly enlarged in diameter. Thus, as shown in FIG. 7, the other end turn portion 5b of the other compression coil spring 5 is supported by being surrounded between the lower part of the perpendicularly erected large-diameter walls 3 and the inner surface of the annular plate 1A over the entire circumference thereof. Moreover, the other end turn portion 5b is supported by being partly surrounded between the outer periphery of the large-diameter wall 3 and the inner surface of the annular plate 1A. Consequently, a strong supporting force can be obtained.

Incidentally, also, in the second embodiment, the two annular plates 1A and 1B having the same shape are used so as to share the annular plates 1A and 1B and the punch 6. However, even in this case, the spring assembly may be configured so that only simply cylindrical projection portions similar to the projection portions are formed in the other annular plate 1B, and that another punch having a portion, whose diameter is larger than the inside diameter of each of the projection portions, is inserted into the inside of these cylindrical projection portions to thereby enlarge the cylindrical projection portions. Thus, the other end turn portion 5b of the other compression coil spring 5 can be supported by being surrounded between the outer peripheral surface of the associated projection portion and the inner surface of the other annular plate 1B.

Figure 8A:
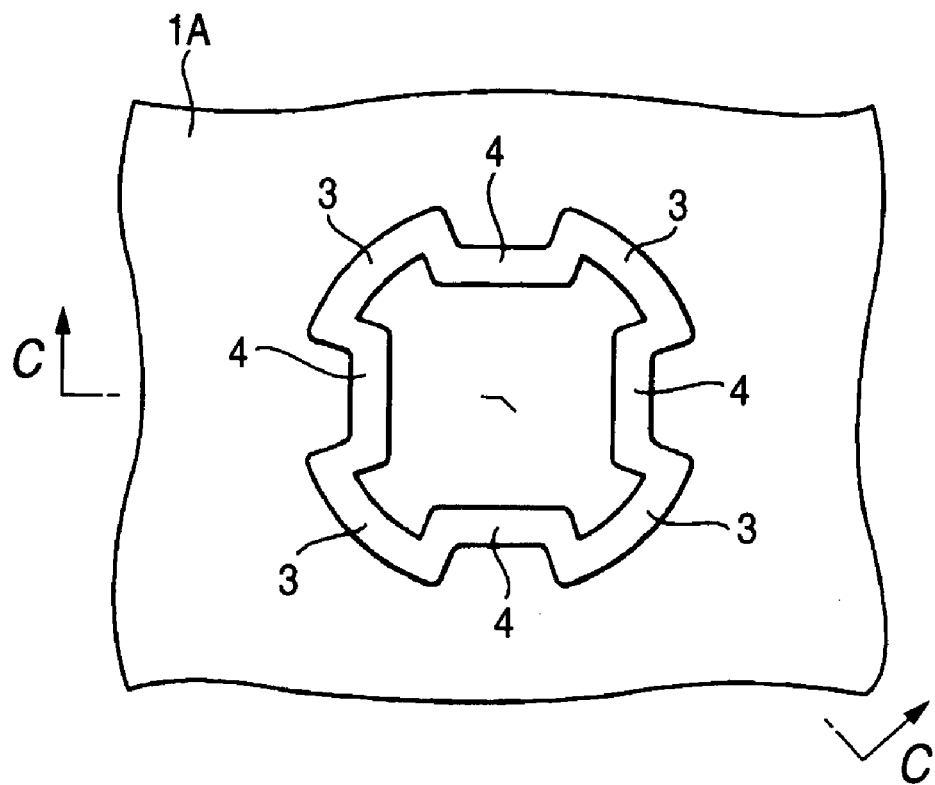
FIG. 8A is a primary-part plan view illustrating the configuration of a projection portion associated with each of annular plates to be used in a manufacturing method according to a third embodiment of the invention.
Figure 8B:
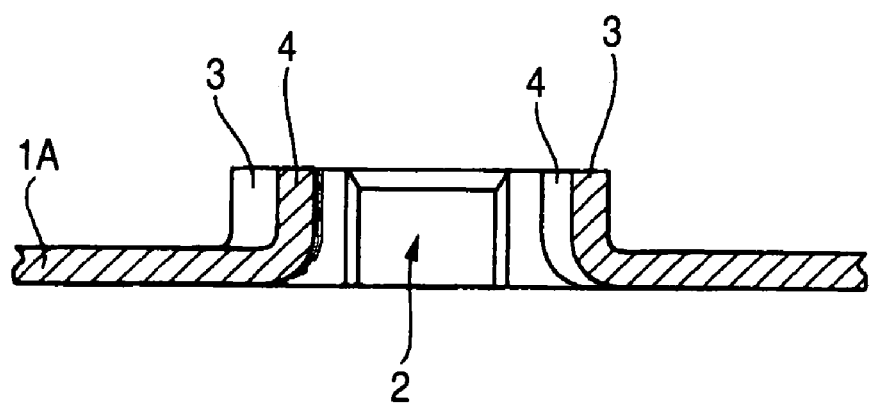
FIG. 8B is a cross-sectional view taken on line C—C of FIG. 8A.

Finally, a method of manufacturing a spring assembly according to a third embodiment of the invention is described hereinbelow. The method according to the third embodiment is similar to those according to the aforementioned first and second embodiments in that the large-diameter walls 3 and the small-diameter walls 4 are alternately provided in the circumferential direction of the projection portion 2. However, the method according to the third embodiment differs from those according to the first and second embodiments in that as shown in FIGS. 8A and 8B, when the small-diameter walls 4 are provided, these small-diameter walls 4 are perpendicularly erected, similarly to the large-diameter walls 3, and that as the perpendicularly erected small-diameter walls 4 are enlarged in diameter, similarly, the large-diameter walls 4 adjoining each of the small-diameter walls 3 are enlarged in diameter. Thus, differently from the first and second embodiments, in the case of the third embodiment, the punch cannot be inserted from a side opposite to the surface, from which the projection portion 2 is formed. Consequently, a direction, in which the punch is inserted, is limited. Moreover, annular plates each having the same shape cannot be used as the two annular plates, that is, as the upper and lower annular plates 1A and 1B.

Thus, according to the third embodiment, as shown in FIGS. 9A and 9B, first, simply cylindrical projection portions 2A, which are similar to those used by the related method, are formed in the other annular plate 1B. Then, a state, in which the other end turn portion 5b of each of the compression coil spring 5 is set on the outer periphery of each of the projection portions 2A, is obtained. Then, a punch 7 having a portion, whose diameter D5 is larger than the inside diameter D4 of the simply cylindrical projection portion 2A, is inserted thereinto, and the projection portion 2A is enlarged in diameter. Thus, the other end turn portion 5b of each of the compression coil spring 5 is supported by being surrounded between the outer peripheral surface of the simply cylindrical projection portion 2 and the inner surface of the other annular plate 1B. Thereafter, a state, in which one of the end turn portions 5a of the compression coil spring 5 is set on the outer periphery of each of the projection portions 2, in which the large-diameter walls 3 and the small-diameter walls 4 are provided, is obtained this time. Then, a punch 6 having a portion, whose diameter D2 is larger than the inside diameter D1 of a space between the small-diameter walls 4, is inserted from the inside of the simply cylindrical projection portion 2A, which has already been caulked, into the inside of a space surrounded by the opposed large-diameter walls 3 and the opposed small-diameter walls 4. Thus, the perpendicularly erected small-diameter walls 4 are outwardly and forcibly spread. Simultaneously with this, the large-diameter walls 3 adjoining this small-diameter wall 4 are indirectly enlarged in diameter. Consequently, the end turn portion 5a of each of the compression coil springs 5 is supported by being surrounded between the outer peripheral surface of each of the large-diameter walls 3 and one 1A of the annular plates. Incidentally, in this case, the following relations hold: D1<D2<D4<D5; and D3=D4.

Therefore, in each of all the embodiments, the projection portions 2 and 2A can be caulked by using ordinary punches 6 and 7, which differ in outside diameter from each other, as the caulking tools. Consequently, the necessity for using a related punch, which has problems with strength and durability, is eliminated.

As described above, the invention employs the aforementioned constitution. Thus, the projection portions are formed in each of the annular plates. Then, the plural large-diameter walls and the plural small-diameter walls are alternately provided in the circumferential direction of each of the projection portions. Consequently, as the space between the small-diameter walls is enlarged in diameter, the space between the large-diameter walls can be enlarged in diameter only by inserting an ordinary caulking punch having a portion, whose diameter is larger than the inside diameter of the small-diameter walls, into the inside of the space surrounded by the large-diameter walls and the small-diameter walls of each of the projection portions. Consequently, the need for using a related punch, which has problems with strength and durability, is eliminated.

What is claimed is:

1. A method of manufacturing a spring assembly, which includes an annular plate and a compression coil spring, and which is adapted to assemble the compression coil spring to the annular plate by caulking a projection portion formed in the annular plate, the method comprising:

forming the projection portion in the annular plate, the projection portion being opposite to the compression coil spring;

alternately providing plural large-diameter walls and plural small-diameter walls in a circumferential direction of the projection portion; and inserting a punch having a portion, whose diameter is larger than an inside diameter of a space between the small-diameter walls, inside a space surrounded by the large-diameter walls and the small-diameter walls of the projection portion, the punch forcibly and outwardly spreading the small-diameter walls, thereby enlarging the large-diameter walls adjoining each of the small-diameter walls and the projection portion in diameter.

2. A method of manufacturing a spring assembly, which includes annular plates and compression coil springs, and which is adapted to assemble the compression coil springs to each of the annular plates by caulking projection portions formed in the annular plates, the method comprising:

forming the projection portions in each of the annular plates, the projection portions to be opposite each other;

setting one of end turn portions of each of the compression springs on the projection portions of one of the annular plates, wherein plural large-diameter walls and plural small-diameter walls are alternately provided in a circumferential direction of each of the projection portions;

inserting a punch having a portion, whose diameter is larger than an inside diameter of a space between the small-diameter walls, inside a space surrounded by the large-diameter walls and the small-diameter walls of the projection portions, the punch forcibly and outwardly spreading the small-diameter walls, thereby enlarging the large-diameter walls adjoining each of the small-diameter walls and the projection portions in diameter;

setting the other end turn portion of each of the compression coil springs on an associated one of the projection portions of the other annular plate; and inserting a punch having a portion, whose diameter is larger than an inside diameter of a space between the small-diameter wall, inside a space surrounded by the large-diameter walls and the small-diameter walls of each of the projection portions provided in the other annular plate, the punch forcibly and outwardly spreading the small-diameter walls, thereby enlarging the large-diameter walls adjoining each of the small-diameter walls and the projection portions in diameter.

3. A method of manufacturing a spring assembly, which includes two annular plates and compression coil springs, and which is adapted to assemble the compression coil springs to the annular plates by caulking projection portions formed in the two annular plates, the method comprising:

forming the projection portions in each of the annular plates, the projection portions being opposite each other;

alternately providing plural large-diameter walls and plural small-diameter walls in a circumferential direction of the projection portions; and inserting a punch having a portion, whose diameter is larger than an inside diameter of a space between the small-diameter walls, inside a space surrounded by the large-diameter walls and the small-diameter walls of each of the projection portions provided in the one of the annular plates, the punch forcibly and outwardly spreading the small-diameter walls, thereby enlarging the large-diameter walls adjoining each of the small-diameter walls and the projection portions in diameter.

4. The method of manufacturing a spring assembly according to claim 1, wherein at least a part of each of the small-diameter walls of the projection portions is inwardly tilted.

* * * * *